(No Model.)
C. C. HARRIS.
SURGICAL APPLICATOR.
No. 421,072. Patented Feb. 11, 1890.
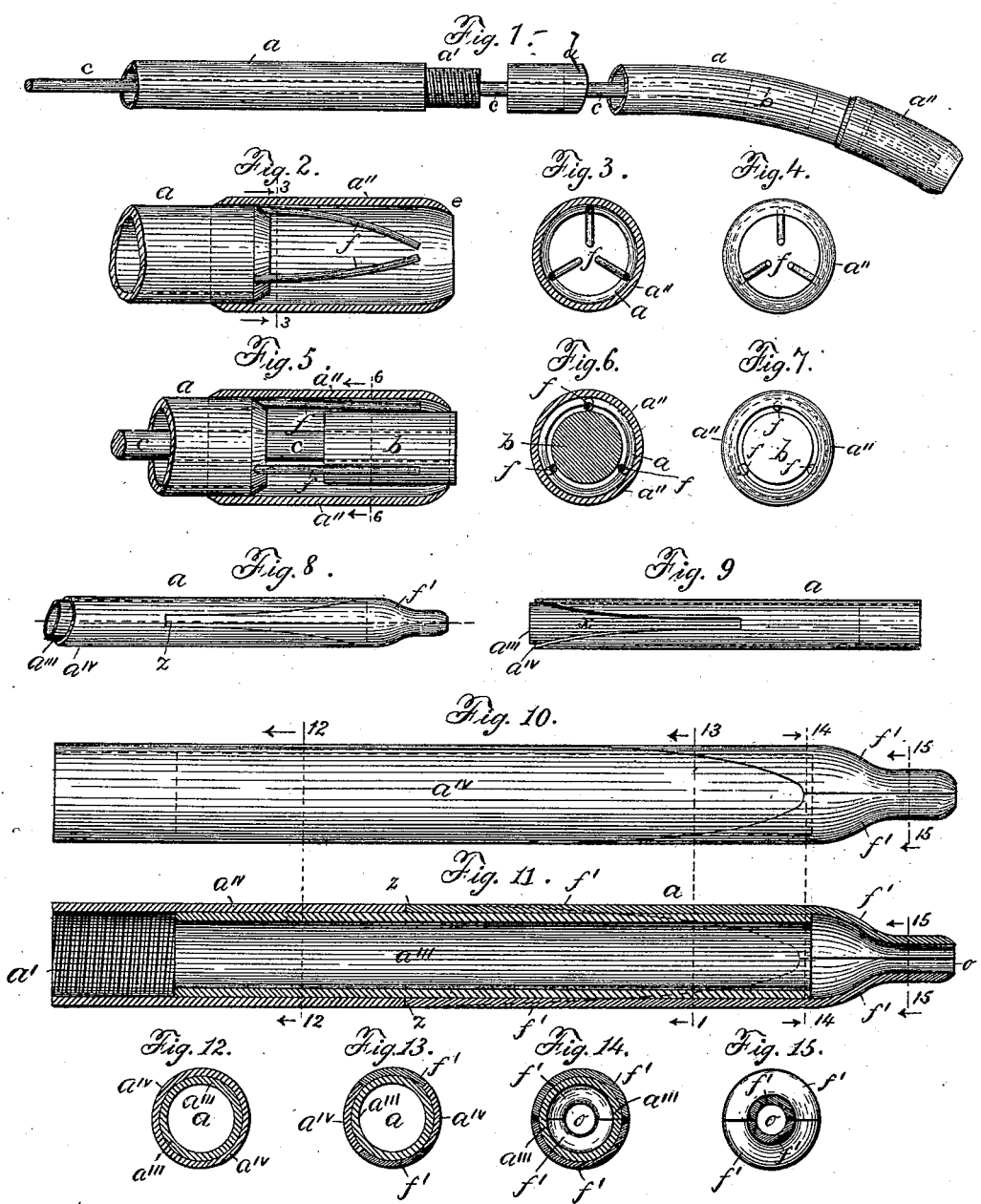
Witnesses:
E. Arthur
G. E. Cruse
Inventor:
Carleton C. Harris
By Knight Bros.
Attys.

UNITED STATES PATENT OFFICE.

CARLETON C. HARRIS, OF CHICAGO, ILLINOIS.

SURGICAL APPLICATOR.

SPECIFICATION forming part of Letters Patent No. 421,072, dated February 11, 1890.

Application filed October 26, 1889. Serial No. 328,293. (No model.)

*To all whom it may concern:*

Be it known that I, CARLETON C. HARRIS, a citizen of the United States, residing at Chicago, in the county of Cook and State of Illinois, have invented certain new and useful Improvements in Applicators, of which the following is a specification.

The present invention relates to an instrument designed to be inserted into any cavity of the body for placing medicine therein; and the object of said invention is to provide an instrument with which medicine in the form of salves, ointments, pellets, pills, capsules, suppositories, and the like may be accurately applied to any desired spot or place within such cavity.

To this end the invention consists in certain features of novelty, that are particularly pointed out in the claims hereinafter, several instruments embodying said invention under as many modifications being first fully described with reference to the accompanying drawings, in which—

Figure 1 is a side elevation of an instrument embodying said invention in its preferred form. Fig. 2 is a sectional elevation of the nozzle end thereof. Fig. 3 is a transverse section thereof on the line 3 3, Fig. 2, looking in the direction of the arrow. Fig. 4 is an end elevation of the nozzle. Fig. 5 is a sectional elevation of the nozzle end of the instrument with the plunger at the limit of its forward movement. Fig. 6 is a transverse section thereof on the line 6 6, Fig. 5. Fig. 7 is an end elevation of the nozzle with the plunger in the position shown in Fig. 5. Fig. 8 is a plan view of the nozzle end of an instrument embodying the invention under a modification. Fig. 9 is a similar view omitting the spring-jaws. Fig. 10 is a side elevation thereof. Fig. 11 is an axial section thereof on the line 11 11, Fig. 9. Figs. 12, 13, 14, and 15 are transverse sections thereof on the lines 12 12, 13 13, 14 14, and 15 15, respectively, looking in the direction of the arrow.

The scale of Figs. 1, 8, and 9 is one and one-half to one, while the scale of the other figures is three to one, save as to the length of the tube. In this respect the drawings show only fragments, the tube being in practice about nine inches in length. This length is, however, arbitrary, and, if desired, instruments designed for different purposes may have different lengths.

In its preferred form the instrument consists of a tube $a$, having jaws at its nozzle end, and a plunger or piston $b$, connected to one end of a slender rod or stem $c$, said rod having at its other end a suitable handle $d$, as shown in Fig. 1. Preferably the tube $a$ is of thin metal and its nozzle end is slightly tapered and rounded off, as shown at $e$, so as to be free from sharp corners. The piston $b$ is of hard rubber or similar material, and is screwed onto the rod $c$. The latter is formed of spring-wire, the handle $d$ being formed by bending the end of the wire into an eye or ring.

The tube of the instrument may be straight, or it may be curved, as shown in Fig. 1, or it may be bent, and the curve or bend may be greater or less than that shown in the drawings to meet the requirements of any particular case. In either case the rod $c$ is preferably straight, but sufficiently flexible to enable it to conform readily to the form of the tube. Again, the tube may be of a single piece; or it may consist of two parts united by a threaded joint $a^1$, as shown in Fig. 1, or by a simple slip-joint. In Fig. 1 the two parts are shown a short distance apart. The jaws $f$ close the end of the tube and are for the purpose of retaining the medicine within the nozzle thereof until discharged by the plunger.

In the instrument shown in Figs. 1 to 7, inclusive, (which for the purposes of this application is elected as the preferred form,) these jaws consist of three (more or less) small springs $f$, arranged equidistant within the nozzle end of the tube and converging toward the outer end thereof. To secure them in place, the extremity of the tube $a$ is chamfered, and to this chamfered surface the correspondingly-chamfered extremities of the springs are soldered. Thus they are secured outside of the path of the plunger and the continuity of the inner surface of the tube $a$ is unbroken. This done, a short piece of tubing $a^{\text{II}}$, whose internal diameter is equal to the external diameter of the tube $a$, is slipped over the springs $f$ and onto the tube $a$, where it is soldered. This piece of tubing $a^{\text{II}}$ is only an extension of the tube $a$, and forms an enlarged chamber, which contains the springs $f$ and permits them to recede from the path of the plunger as the latter is advanced to expel the medicine. It extends slightly beyond the extremities of the springs $f$, and has the taper $e$, already described, so that the opening at its extremity is about the same diameter as the interior of the tube $a$. To use this instrument for placing pellets, pills, capsules, suppositories, and the like, the plunger is entirely removed from the tube, and the pellet, pill, capsule, suppository, or the like is dropped into the open end thereof. It passes through the tube until it is caught by the spring-jaws $f$, by which it is held just within the nozzle end of said tube. The plunger is then replaced and brought in contact with the pellet, &c. Medicine of a salve-like consistency, not sufficiently tenacious to retain its form if molded into pellets, may be inserted in the nozzle end of the instrument. The instrument is then inserted into the cavity of the body and its nozzle end brought to the place where it is desired to apply the medicine. If pressure is then exerted upon the plunger, it will expel the medicine and in doing so spread the jaws $f$ apart, as shown in Figs. 5, 6, and 7.

The nozzle end of the instrument (shown in Figs. 8 to 15, inclusive) is formed of two tubes $a^{\text{III}}$ and $a^{\text{IV}}$, fitted and secured one within the other concentrically. The outer extremity of the inner tube $a^{\text{III}}$ is squared, while the corresponding end of the outer tube $a^{\text{IV}}$ is bifurcated, a V-shaped piece being cut out of each of its opposite sides, as suggested in Fig. 9. When the two tubes are secured together one within the other, they constitute in effect a single tube having in its outer surface V-shaped grooves or depressions $x$, arranged diametrically opposite each other. To the tube thus formed are secured the spring-jaws $f^{\text{I}}$, one of which fits in and fills each of the grooves $x$, so as to complete the continuity of the outer surface of the tube $a^{\text{IV}}$, as shown in Fig. 13. At the extremity of the tube $a^{\text{IV}}$ the two jaws $f^{\text{I}}$ meet each other, and from there out to their extremities they unitedly form a gradually-tapering bisected nipple, having at its extremity a small axial orifice $o$, through which the medicine may be expelled by the plunger or allowed to fall when the jaws are forced apart. The object in drawing the nozzle of this instrument down to such a fine point is to enable its insertion into cavities that are too small to receive the end of the instrument shown in Fig. 1. If the point of the nozzle can be inserted into the mouth of a cavity, the plunger, when advanced, will spread the jaws, and in so doing stretch the mouth of the cavity sufficiently to enable it to receive the medicine which the open jaws let fall. The spring-arms of the jaws are very flexible, so that they will yield to a slight pressure upon the plunger. They are secured to the tube by being soldered at their extremities $z$.

Having thus described my invention, what I claim as new therein, and desire to secure by Letters Patent, is—

1. In an applicator, the combination, with the tube and the plunger, of movable jaws fixed to the tube and adapted to be opened by the plunger, substantially as set forth.

2. In an applicator, the combination, with the tube and the plunger, of movable jaws situated within the tube, substantially as set forth.

3. In an applicator, the combination, with the tube and the plunger, of the automatic jaws situated within the tube, substantially as set forth.

4. In an applicator, the combination, with the tube and the plunger, of automatically-closing spring-jaws joined to the tube outside of the path of the plunger, substantially as set forth.

5. In an applicator, the combination, with the tube and the plunger, of the automatically-closing jaws, consisting of the springs $f$, joined to the tube outside the path of the plunger and converging toward the nozzle end of the tube, as set forth.

6. In an applicator, the combination of the tube, the plunger, and the spring-jaws joined to said tube, said tube having a chamber for the reception of said jaws, substantially as set forth.

7. In an applicator, the combination of the tube $a$, the converging spring-jaws $f$, secured to the end thereof, the extension-tube $a^{\text{II}}$, inclosing the jaws $f$ and secured to tube $a$, and the plunger, substantially as set forth.

8. In an applicator, the combination of the tube $a$, having its extremity chamfered, the springs $f$, secured to said chamfered end and converging therefrom, the extension-tube $a^{\text{II}}$, inclosing said springs and secured to the tube $a$, and the plunger, all constructed and arranged to operate substantially as set forth.

CARLETON C. HARRIS.

Witnesses:
R. C. OMOHUNDRO,
L. M. HOPKINS.